(No Model.) 2 Sheets—Sheet 2.
W. F. HARRIMAN.
TROLLEY ARM FOR ELECTRIC CARS.
No. 427,569. Patented May 13, 1890.
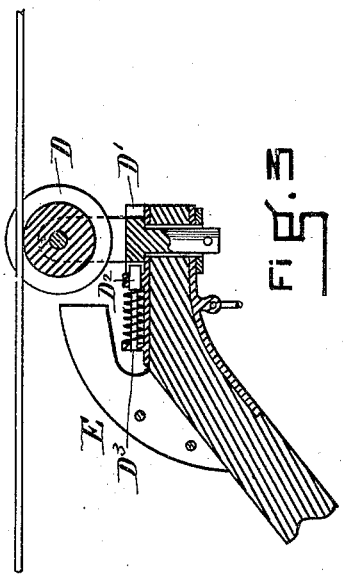
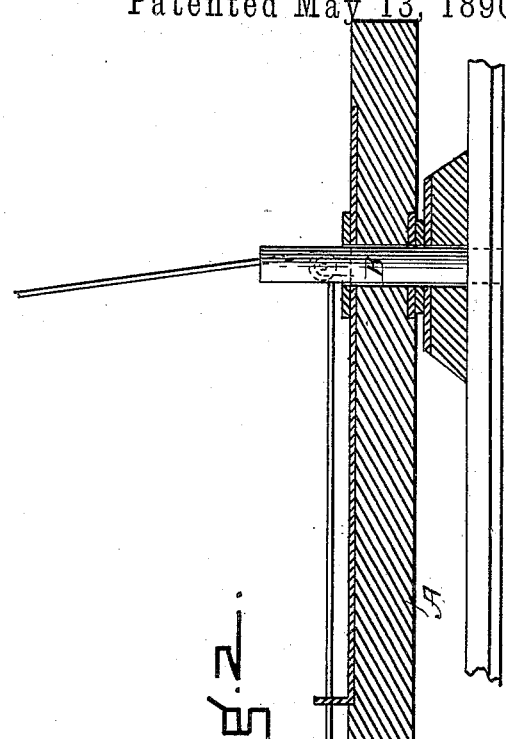
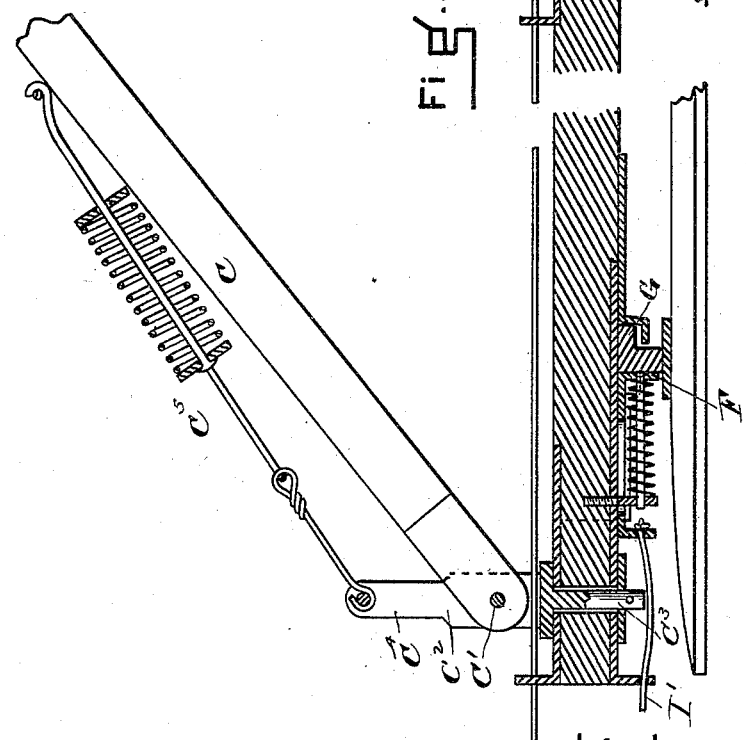
WITNESSES.
John H. Taylor.
Ellen B. Tomlinson.
INVENTOR
William F. Harriman,
by Alex. P. Browne.
attorney.

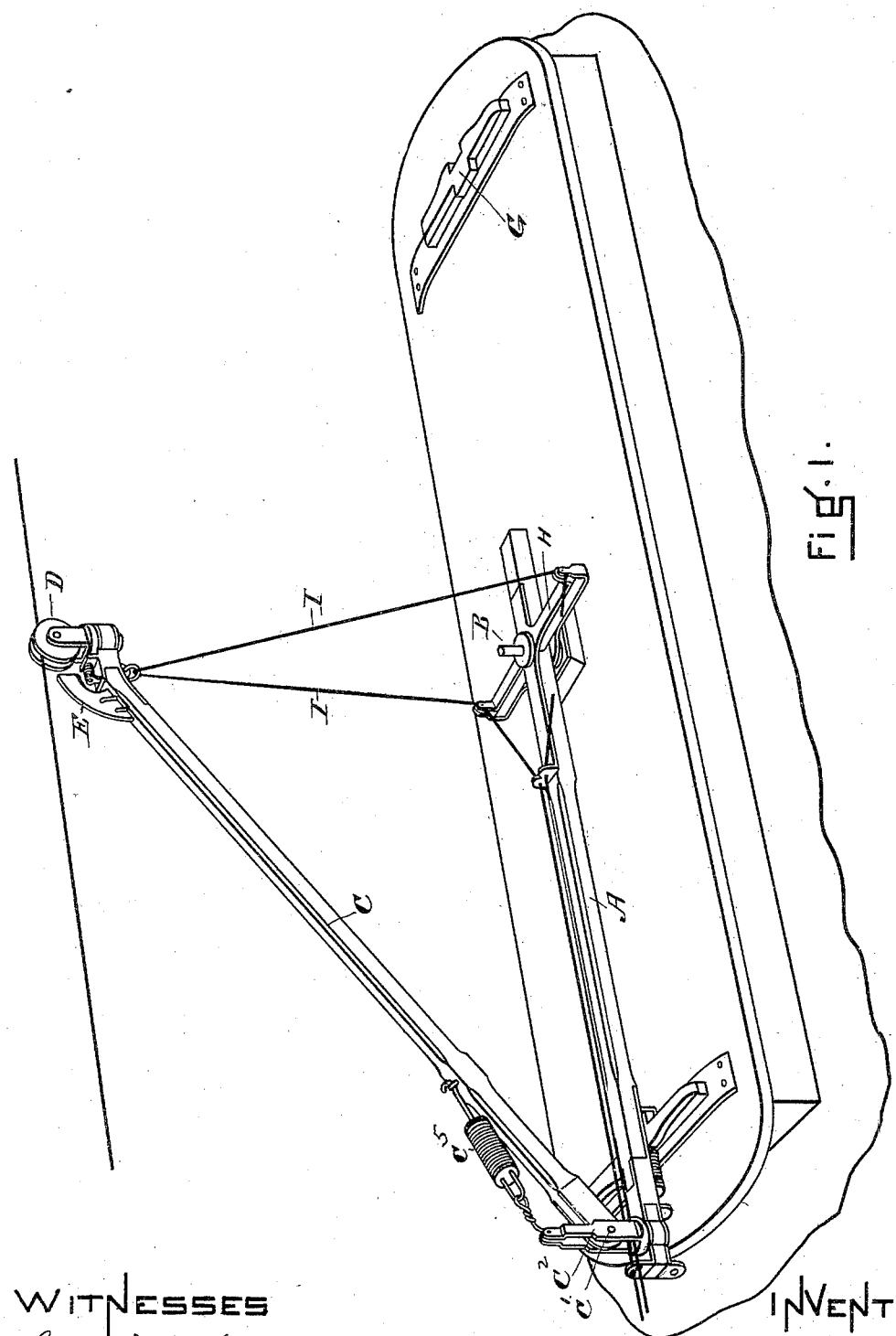

UNITED STATES PATENT OFFICE.

WILLIAM F. HARRIMAN, OF DES MOINES, IOWA.

TROLLEY-ARM FOR ELECTRIC CARS.

SPECIFICATION forming part of Letters Patent No. 427,569, dated May 13, 1890.

Application filed February 24, 1890. Serial No. 341,443. (No model.)

*To all whom it may concern:*

Be it known that I, WILLIAM F. HARRIMAN, of Des Moines, in the county of Polk and State of Iowa, a citizen of the United States, have invented certain new and useful Improvements in Trolley-Arms for Electric Cars, of which the following is a specification.

My invention relates to that class of devices by which the trolley or contact-roller carried by an electric car or motor is supported and operated, relatively, to the car itself and the overhead conductor of electricity.

The object of my invention is to improve the construction of these devices, so that certain difficulties of operation heretofore existing shall be obviated.

It has been found, in practice, desirable that the trolley should be carried at the upper end of an arm supported at its lower end by the top of the car and inclined backwardly with relation to the direction in which the car is to travel. Furthermore, as the car is frequently required to reverse its direction, particularly at the end of its route, it has been customary to make the trolley-arm reversible, so that its inclination shall be rearward in whichever direction the car is traveling. It has been also customary to support the lower end of the trolley-arm upon the top of the car at a point substantially central thereof and to incline the trolley-arm rearwardly from this point, so that when the car is running the trolley will be over the rear of the car and in some cases even behind it. By this construction, as is evident, whenever the car turns a curve the radius of the curve of the trolley will be different from that of the curve which the car itself takes. There is consequently a liability of the trolley to leave the wire, especially when rounding curves, thereby causing annoyance and interruption in the service. Again, with the trolley-arms as heretofore constructed, which hold the trolley against the wire at a point substantially in the rear of the center of the car, it is obvious that when the car reaches one end of its route and its direction is to be reversed it is necessary to remove the trolley from the wire, swing it round to its new position, and replace it. If, as is frequently the case, a portion of the current is used for lighting the car, this removal of the trolley from the wire causes the temporary extinguishment of the lights, and is consequently objectionable.

According to my improvement I construct a trolley-arm having the desired rearward inclination, which, however, holds the trolley against the current-wire at a point substantially over the center of the car-body. As the paths of the trolley so mounted and the car in rounding curves are the same, there is substantially no tendency of the trolley to leave the wire. Furthermore, and as another feature of my improvement, I make it possible for the trolley-arm to be reversed when desired without removing the trolley from the wire, and hence without extinguishing the lights. In this way, also, by my improvement the time is saved which would otherwise be lost in replacing the trolley upon the wire after its position had been reversed, as above explained.

In the accompanying drawings I have represented an embodiment of my present invention in the form now best known to me, and I will now proceed to describe the structure therein shown.

In the drawings, Figure 1 is a perspective view of the entire device. Fig. 2 is a sectional view of the lower portion of the device, and Fig. 3 a detail which will be hereinafter more fully explained.

In the drawings, A represents an arm pivoted upon the top of the car at a point, as shown at B, substantially at the center thereof. This arm is preferably horizontal and extends toward one end of the car the desired distance which in practice will carry its outer end substantially over the end of the car. Upon this arm at a point removed from its pivot and preferably at or near its outer end is attached the lower end of the trolley-carrying arm C. This attachment, as shown at C′, is vertically pivotal, in order to allow the necessary vertical movement of the trolley-arm under and against the pressure of the usual spring. It may also be horizontally pivotal, so as to allow the movement of the trolley-arm to one side, for a purpose to be hereinafter pointed out. The specific device for obtaining these two motions for the trolley-arm which I prefer is shown in the drawings, and consists of an upright C², provided at its lower end with a pin C³, extending through the arm A, a shoulder on the upright allowing it to turn circularly with reference to the said arm A. Within the upright is the pivot C', upon which the lower end of the trolley-arm C may turn, as before described. The upward extension C⁴ of this upright piece serves as a convenient point for attaching the ordinary coiled spring C⁵, which is also connected to the trolley-arm, as shown, to force it up against the conductor-wire.

At the upper end of the trolley-arm C is mounted the trolley D, which is the ordinary grooved wheel of the necessary material for the purpose required. In order that this wheel may remain in contact with the wire while the trolley-arm is being shifted from one end of the car to the other, I swivel it upon the end of the trolley-arm. I prefer to form this swivel-joint, as illustrated at Fig. 3, with a V-notch or latch-connection, one part of this being formed upon the post D', which supports the trolley, and the other upon a movable latch-piece D² upon the end of the trolley-arm. A coiled spring D³ surrounds this piece and tends to hold the two elements of the latch together.

When it is desired to shift the trolley-arm from one end of the car to the other, swinging it around will force the latch out of its notch, the two V parts acting as wedges, and when the arm is swung round to its other position the latch D² will be forced by the spring D³ into a corresponding V-notch on that side of the trolley-carrying strap D'. It will be observed that in this way I obtain a connection between the strap which carries the trolley and the trolley-arm, such that it will hold the trolley in place and still allow the trolley-carrying mechanism to be shifted from end to end of the car without removing the trolley from the wire. A guard to prevent the trolley from catching in the cross-wires and other overhead obstructions which it may come in contact with in the event of its leaving the conductor-wire may be placed upon the upper end of the trolley-arm, as shown at E.

A suitable catch should be provided near each end of the top of the car and upon the central line thereof to hold the arm A in place. This may be formed in a variety of ways. For example, a spring-latch F may be employed adapted to enter a catch G, and thus hold the arm A in its place. One of these catches will be provided at each end of the roof of the car.

It is evident that the structure thus far described has the following capacities: It holds the trolley in contact with the conductor-wire under spring-pressure applied to a rearwardly-extended trolley-arm, but with that trolley in a position substantially over the center of the car. Furthermore, when the trolley is swiveled upon the trolley-arm in the manner described its supporting mechanism may be reversed from end to end of the car without removing the trolley from the wire.

Any suitable device may be made use of for swinging my improved trolley-carrying apparatus from one end of the car to the other when it is desired to change its direction and also for raising and lowering the trolley-arm to place the trolley upon and remove it from the overhead wire. I prefer to employ for this purpose, however, the device shown, which I will now proceed to describe. Upon the arm A, I provide a cross-bar or double outrigger H, as shown at Fig. 1. Cords I I lead from the upper part of the trolley-arm through suitable guides on the ends of this outrigger H, and thence are carried out to the end of the arm A and down within reach of the employé whose duty it is to manipulate the trolley-carrier. In practice, as the ends of these cords when so arranged will always be at the forward end of the car, this will enable the motor-man to also operate the trolley-carrier when necessary. When the latch F is employed, the end I of the cord may be carried up to the latch to operate it, as shown at Fig. 2. Again, by using the two cords, one passing through a guide on each end of the outrigger H, and by mounting the trolley-arm, as before described, so that it may swing radially, it is obvious that as one or the other of the cords is tautened and the other loosened the trolley can be moved sidewise, thereby aiding the operator in placing it upon the overhead wire, and also in replacing the trolley if it should become removed.

I claim—

1. The combination, with an electric car, of an arm horizontally pivoted upon the top and substantially at the center thereof, the said arm extending toward one end of the car and having secured to it at a point distant from its said horizontal pivot a trolley-arm inclined toward the center of the car, whereby the said trolley-arm may be supported and also be shifted from end to end of the car, when desired.

2. The combination, with an electric car, of an arm horizontally pivoted upon the top thereof, as described, an inclined trolley-arm supported thereon, and a trolley connected to the said trolley-arm by a swivel-joint.

3. The combination, with an electric car, of an arm A, horizontally pivoted upon the top thereof, as described, and carrying a trolley-arm C, and catches at or near each end of the top of the car to receive and hold the said arm in position.

4. In combination with an electric car, a supporting-arm horizontally pivoted upon the top thereof, as described, a trolley-carrying arm connected thereto, and a trolley connected to the said trolley-carrying arm by a swivel-joint provided with a latch mechanism, for the purpose described.

5. In combination with an arm A, pivotally connected to the top of the car, as described, a trolley-arm C, connected thereto by a vertical and horizontal pivotal connection and carrying a suitable trolley D, a spring to force said trolley-arm upward, an outrigger H, and cords I I, as set forth.

In testimony whereof I have hereunto subscribed my name this 13th day of February, A. D. 1890.

WILLIAM F. HARRIMAN.

Witnesses:
ELLEN B. TOMLINSON,
JOHN H. TAYLOR.